United States Patent
Kohn et al.

[11] 3,876,229
[45] Apr. 8, 1975

[54] FENDER STRUCTURE FOR VEHICLE WHEELS

[75] Inventors: Robert Kohn; Kenneth L. Hanke, both of Michigan City, Ind.

[73] Assignee: Bobko, Inc., Michigan City, Ind.

[22] Filed: Dec. 10, 1973

[21] Appl. No.: 423,066

[52] U.S. Cl. .................. 280/152 R; 280/154.5 R
[51] Int. Cl. ............................................. B62b 9/16
[58] Field of Search ........ 280/152 R, 152 B, 153 R, 280/153 A, 153 B, 154.5 R

[56] References Cited
UNITED STATES PATENTS

| | | | |
|---|---|---|---|
| 2,311,941 | 2/1943 | Gustafson | 280/154.5 R X |
| 2,679,403 | 5/1954 | Howard et al. | 280/154.5 R |
| 3,506,282 | 4/1970 | Miyanaga | 280/152 R |

Primary Examiner—David Schonberg
Assistant Examiner—Michael J. Furman
Attorney, Agent, or Firm—Hobbs & Green

[57] ABSTRACT

A fender structure for single or tandem vehicle wheels, in which a pivoted section yields when contacted by the wheel. The fender structure for tandem wheels includes a forward and rearward fender section pivoted to one another and to a supporting bracket at their adjacent ends on a perpendicular line between the wheels arranged in tandem, to permit the outer ends of the sections to pivot upwardly in response to the force of the wheels as the tandem wheels oscillate over bumps and through depressions in the road. Brackets, preferably disposed at the outer ends of the fender sections, support the sections, normally in spaced relation to the wheels, and resilient means urge the sections into engagement with the respective brackets. In the single wheel installation, only one pivoted section is used.

11 Claims, 7 Drawing Figures 3,876,229

FENDER STRUCTURE FOR VEHICLE WHEELS

Conventional semi-trailers and the tractors therefor often have dual tandem wheels with a fulcrum therebetween which permits the wheels to pivot to follow the contour of the roadway, such that as the forward wheel drops or moves downwardly, the rear wheel moves upwardly, and vice versa. On rough roads, bumps and chuck-holes may cause the tandem wheels temporarily to oscillate rapidly, particularly if the truck is travelling at moderate to high rates of speed. In the past, the conditions which cause the tandem wheel to oscillate about the fulcrum have prevented the use of effective fenders over the wheels, particularly where the space between the top of the tires on the wheels and the underside of the semi-trailer is limited. When fenders have been used under these conditions, they interfere with the oscillation of the tandem wheels and are often damaged when bumped and rubbed by the wheels when the wheels oscillate under the aforementioned conditions, particularly if the fenders are placed close to the tires in order to make an installation in limited space. It is therefore one of the principal objects of the present invention to provide a fender structure for the wheels of semi-trailers and tractors therefor, which can be mounted in limited space between the top of the wheels and the underside of the semi-trailer, and yet which will not interfere with the operation of the wheels under various road conditions, or become damaged if bumped, rubbed or scraped by the wheels.

Another object of the invention is to provide a fender structure for dual tandem wheels, which is so constructed and designed that sections thereof will yield from normal position if contacted by the wheel, thus preventing damage to the fender structure or wheel, and which will immediately return to its normal position as the wheel returns to its normal operating position.

Still another object of the invention is to provide a fender structure for semi-trailers and tractors therefor, which is sturdy and versatile, and which can be readily adapted to either the tandem wheels of the semi-trailer or the wheels of the tractor.

A further object is to provide a fender structure for either single or tandem wheel arrangements which can be readily installed in limited space and which will give long, trouble-free service, and will give effective protection to the tractor and trailer and to other vehicles on the road, from throwing stones, slush, mud and the like, thus providing an additional health and safety factor on the road.

Additional objects and advantages of the present invention will become apparent from the following description and accompanying drawings; wherein.

Figure 1:
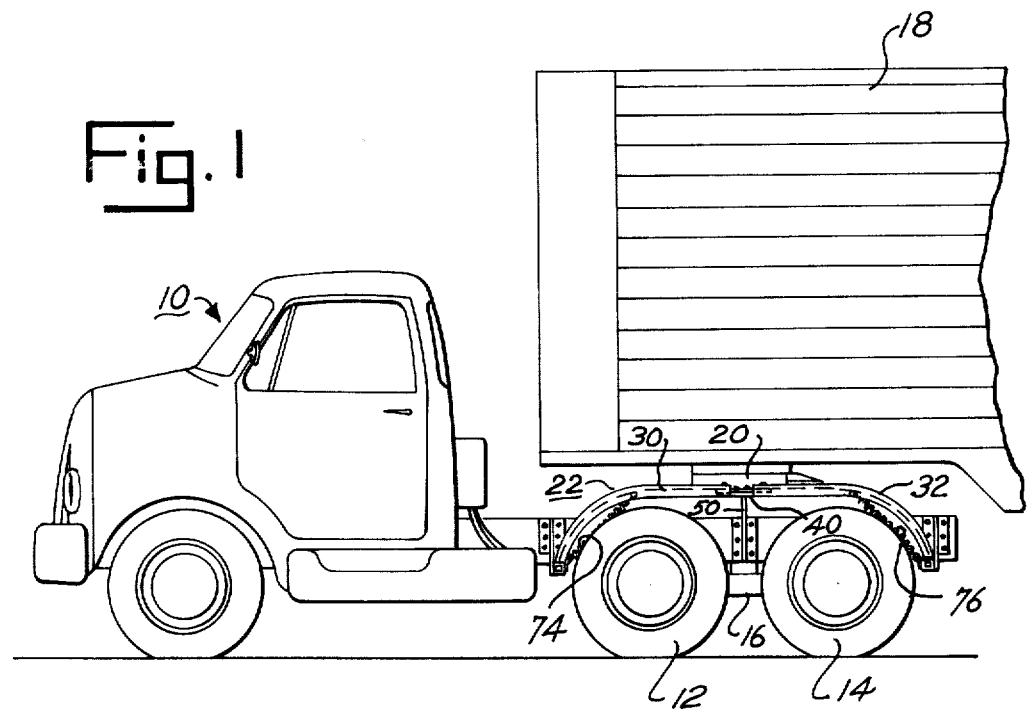
FIG. 1 is a side elevational view of a semi-trailer tractor and a fragmentary view of the semi-trailer, illustrating the present fender structure.
Figure 2:
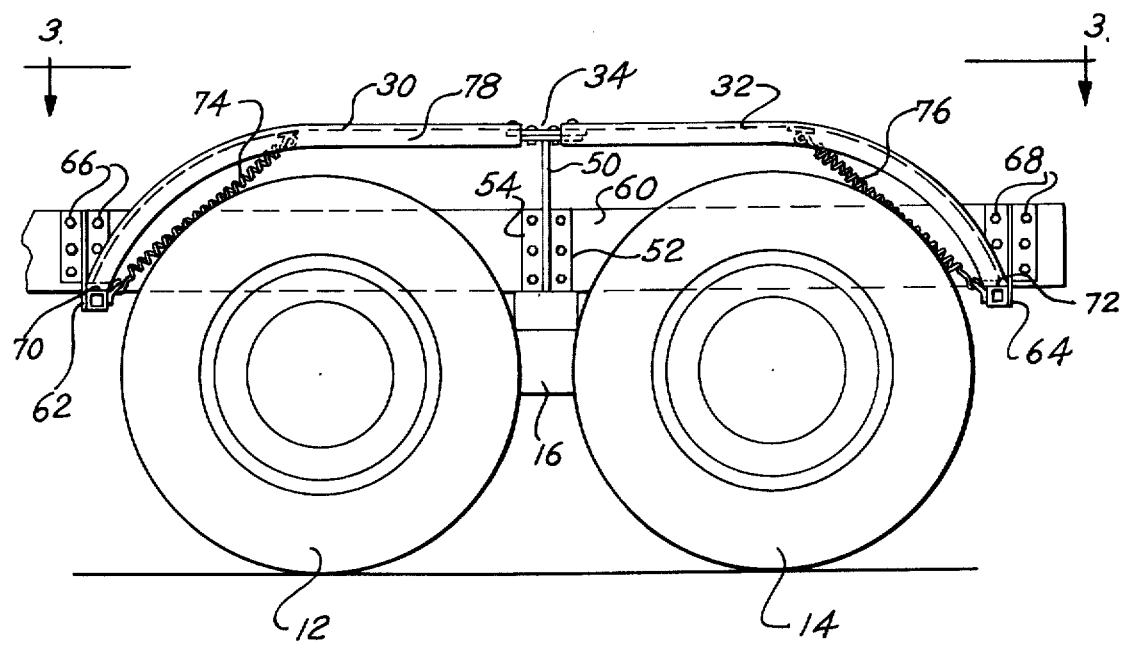
FIG. 2 is an enlarged view of the dual tandem wheels and present fender structure, similar to that seen in FIG. 1, showing the fender structure mounted in operable position.
Figure 3:
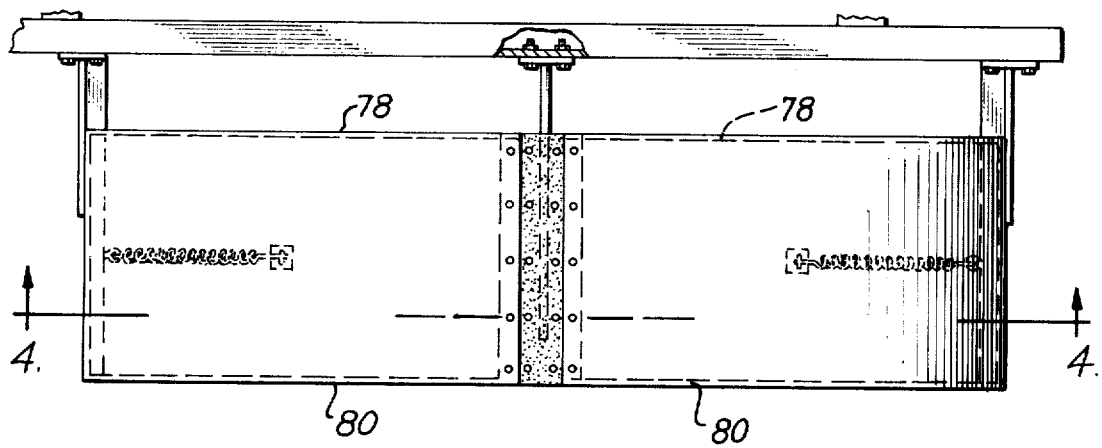
FIG. 3 is a top plan view of the fender structure shown in FIGS. 1 and 2.
Figure 4:
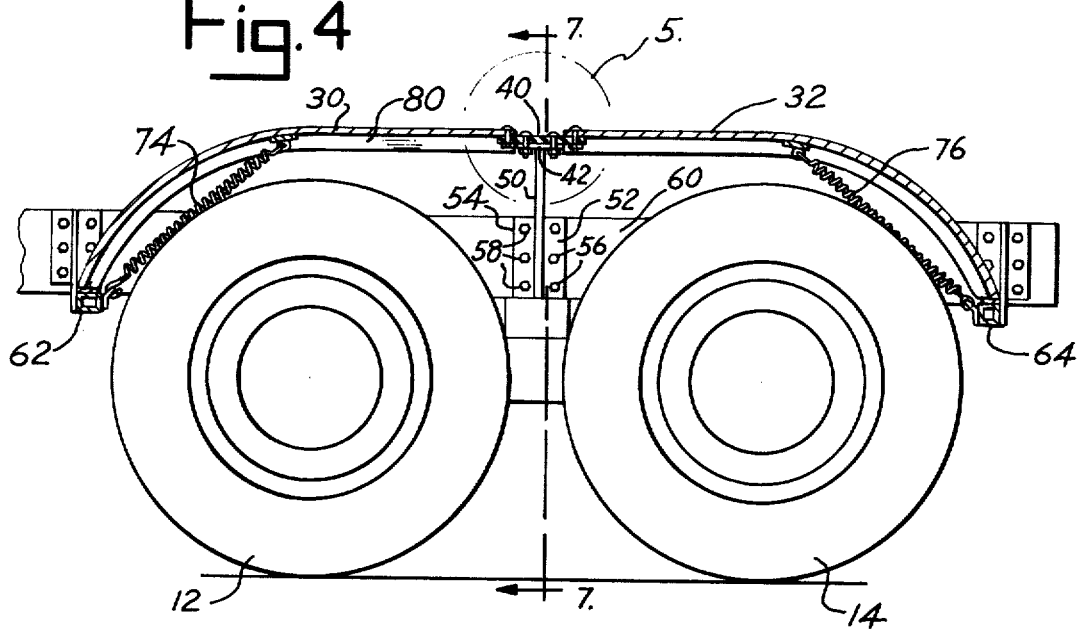
FIG. 4 is a vertical cross sectional view of the fender structure shown in the preceding figures, the section being taken on line 4 — 4 of FIG. 3.
Figure 5:
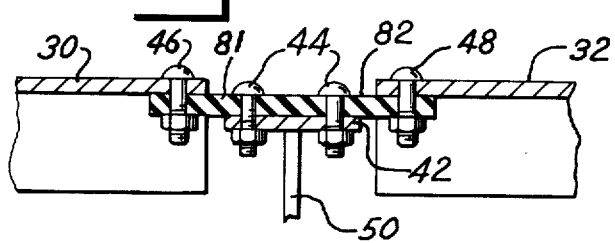
FIG. 5 is an enlarged fragmentary cross sectional view of a portion of the fender structure and support therefor.

Referring more specifically to the drawings and to FIG. 1 in particular, numeral 10 indicates generally a tractor for a semi-trailer having dual tandem wheels 12 and 14 mounted for oscillation on a pivoted axle support shown generally at numeral 16. A semi-trailer 18 is connected to the tractor at the fifth wheel 20 mounted on the rear of the tractor above the tandem wheels, and numeral 22 indicates generally the present fender structure mounted above the two wheels 12 and 14 and beneath the forward end of the semi-trailer 18. The fender structure can be used effectively with a number of different types and makes of tractors, the one shown being merely for the purpose of illustrating the present invention. The semi-trailer may have dual tandem wheels similar to those shown in the drawings for the truck, and the present fender structure may be used in conjunction with the trailer tandem wheels without substantial modification.

The fender structure 22 includes front and rear generally horizontally disposed sections 30 and 32 connected to one another at the center between the two wheels 12 and 14 by a hinge means 34, the hinge permitting the two sections to pivot upwardly at their outer ends. The hinge shown in the drawings consists of a flexible rubber member 40 secured to a plate 42 by a plurality of bolts 44, and to the adjacent edge of sections 30 and 32 by a plurality of bolts 46 and 48, respectively. The two sectons are spaced from the plate, and the flexible rubber member functions as a hinge for each of the two sections 30 and 32.

Plate 42 is rigidly supported by a bracket 50 secured to the frame by plates 52 and 54 and bolts 56 and 58 extending through the plates and the frame 60 of the tractor. Thus the bracket 50 rigidly holds the plate 42 in position above the top of the wheels and at a position on a line substantially in the center between the two wheels.

The outer ends of the two sections 30 and 32 are supported by brackets 62 and 64, respectively, the two brackets being secured to frame 60 by bolts 66 and 68. The forward and rearward edges of sections 30 and 32 are supported on shoulders 70 and 72 of brackets 62 and 64, and are yieldably urged into contact therewith by springs 74 and 76, spring 74 being anchored to section 30 at its upper end and to bracket 62 at its lower end, and spring 76 being anchored to section 32 at its upper end and to bracket 64 at its lower end. The springs are sufficiently strong that they will retain the fender sections firmly in contact with the brackets unless and until they are lifted therefrom by the wheels 12 or 14. The two springs 74 and 76 are shown attached to the respective sections between the outer and inner wheels 12 and 12' and between outer and inner wheels 14 and 14', respectively. The two sections 30 and 32 may be made of fiberglass, aluminum or steel, or other suitable material, and are relatively rigid in structure, preferably being reinforced by downwardly extending flanges 78 and 80 along the outer and inner sides of the two sections, the two flanges giving substantial rigidity to the sections.

Figure 6:
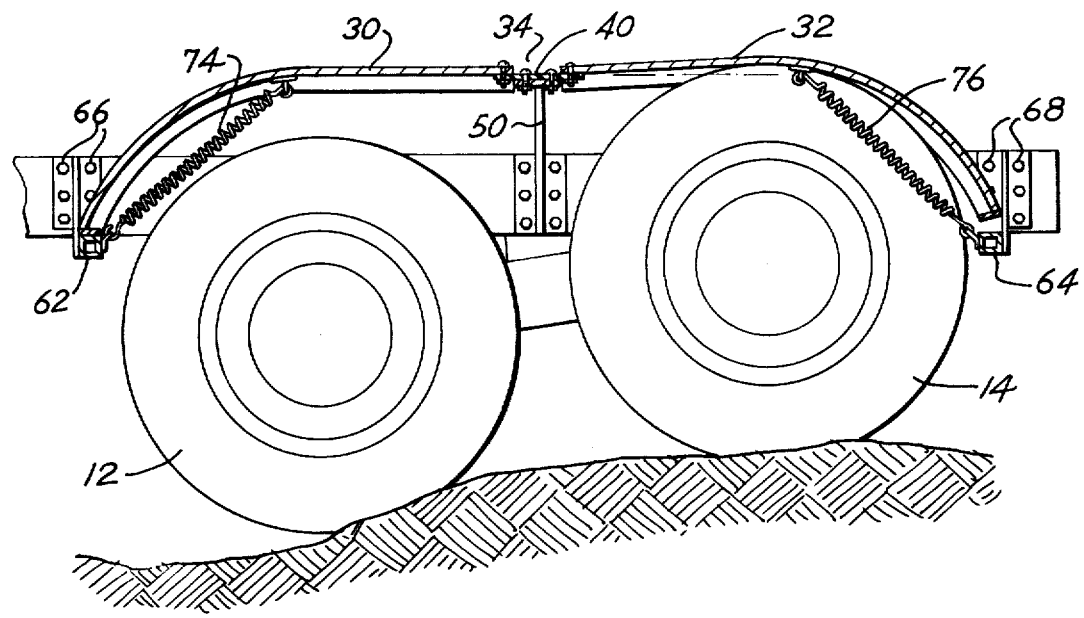
FIG. 6 is a side elevational view of the dual tandem wheels and cross sectional view of the fender structure, similar to that shown in FIG. 4, illustrating the manner in which the fender structure operates.
Figure 7:
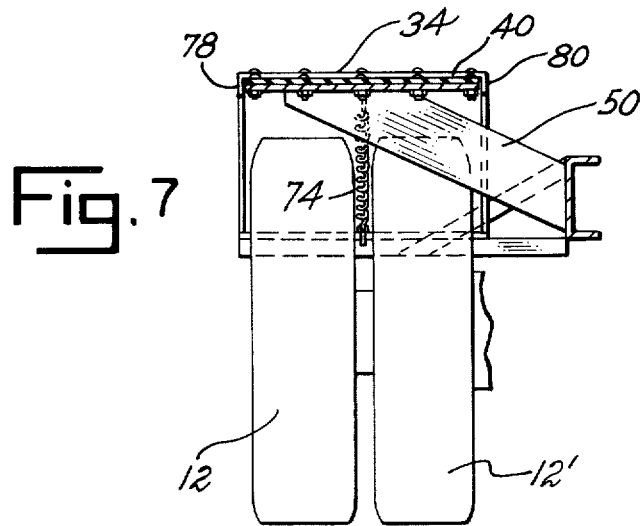
FIG. 7 is a vertical cross sectional view of the present fender structure, the section being taken on line 7 — 7 of FIG. 4.

In the operation of the present fender structure mounted in the manner illustrated in the drawings, the two sections 30 and 32 are normally spaced from the periphery of the two wheels 12 and 14 so that the outer edges of the two sections rest on the respective brackets 62 and 64 and are retained firmly in place thereon by springs 74 and 76. With the fender sections in this position, the water, slush and dirt from the wheels are deflected downwardly instead of upwardly onto the underside of the seim-trailer above the two wheels. Further, the forwardly and rearwardly curved portion of sections 30 and 32 prevent the water, slush and dirt from being thrown from the wheels onto other portions of the truck and semi-trailer, and onto other vehicles on the road. In the event the tandem mounted wheels 12 and 14 pivot on the center between the wheels, i.e., for example, the forward wheel moving downwardly into a depression or the rearward wheel moving upwardly over a raised portion such as a bump, the upwardly moving wheel engages the underside of fender section 32. The force of the wheel against the underside of the section lifts the section by pivoting it at hinge means 34, raising the outer end of the section as illustrated in FIG. 6. The section rides on the wheel as the wheel is in its elevated position, which is normally only a fraction of a second. As the wheels oscillate to their original substantially level position, the raised fender section returns to its lowered normal position, with the outer end of the previously raised section again in firm engagement with the respective brackets 64.

In travelling over rough roads where there are substantial bumps and depressions, the wheels may oscillate relatively rapidly between raised and lowered positions, so that the forward fender will momentarily be raised and then lowered and the rear fender section raised and lowered. However, on normal roads, the two sections are not contacted by the wheels, and hence remain in their lowered positions with the outer ends of the sections resting on their respective brackets. The hinging action of the hinge means 34 occurs generally along the lines 81 and 82 at the rear end of section 30 and at the forward end of section 32, respectively. Other types of hinge means may be used; however, the type shown performs satisfactorily under adverse conditions, such as with water, slush, dirt, snow and ice. Since the fender sections can be raised if and when the wheels need additional space to oscillate, the fender can be mounted in relatively limited space between the upper periphery of the wheels and the underside of the semi-trailer. The finders occupy very little additional space over and above that normally occupied by the wheels without the fenders under the oscillating conditions of the tandum wheels.

The fenders can be readily adapted to dual tandem wheels of the semi-trailer, and bracket 50 may be changed as required to mount the fenders in operating position over the wheels. The fender sections may be spaced either further away or closer to the wheels than shown in the drawings in order to meet operating requirements with the available space between the wheels and the underside of the semi-trailer. However, they must be spaced downwardly from the semi-trailer a distance sufficient to permit the semi-trailer and tractor to move angularly with respect to one another in negotiating curves and turns.

While the specific embodiment shown in the drawings involves tandem wheels, the present invention can be used in conjunction with a single wheel. In this latter arrangement, only one section, such as rear section 32, is used with the forward end thereof being pivoted on a bracket, thus permitting the rear end of the section to be raised and lowered by the tire when the wheel moves up and down as the tractor and trailer traverse rough roads. The forward section is not used in this arrangement, and the forward end of the installed section is preferably curved downwardly along the front of the wheel to provide additional protection.

Only one embodiment of the present fender structure for tandem vehicle wheels has been shown and described in detail herein; however, various changes and modifications may be made without departing from the scope of the invention.

We claim:

1. A fender structure for a vehicle wheel comprising a fender section adapted to be mounted above the wheel, a support means for one end of said fender section, hinge means connected to one end of said section and to said support means to permit the opposite end of said section to be raised by engagement of the wheel, and a means for releaseably positioning the other end of said section in spaced relation to said wheel.

2. A fender structure for a vehicle wheel as defined in claim 1 in which spring means is connected to said section to urge said section downwardly to said positioning means.

3. A fender structure for tandem vehicle wheels, comprising a forward fender section and a rearward fender section adapted to be mounted above the forward and rear tandem wheels, a support means for the adjacent ends of said fender sections, hinge means connected to the adjacent ends of each of said sections and to said support means to permit the opposite ends of said forward and rear sections to be raised by engagement of the respective tandem wheel, and a means for normally positioning said sections in spaced relation to said tandem wheels.

4. A fender structure for tandem vehicle wheels as defined in claim 3 in which said means for positioning said opposite ends consists of brackets disposed at said opposite ends and secured to a supporting structure on the vehicle.

5. A fender structure for tandem vehicle wheels as defined in claim 4 in which spring means are connected to said sections for seating the ends of said sections opposite the hinges on said brackets.

6. A fender structure for tandem vehicle wheels as defined in claim 5 in which said hinge means consists of a flexible member connected to the adjacent edges of said fender sections and secured to said support means.

7. A fender structure for tandem vehicle wheels as defined in claim 3 in which the means for normally positioning said opposite ends in spaced relation to said tandem wheels consists of brackets disposed at said opposite ends and said hinge means consists of a flexible member connected to the adjacent ends of said sections and to said support means.

8. A fender structure for tandem vehicle wheels as defined in claim 3 in which said support means includes a fixture for rigidly attaching said support means to a supporting structure on the vehicle.

9. A fender structure for tandem vehicle wheels as defined in claim 3 in which said hinge means consists of a flexible member connected to the adjacent edges of said fender sections and secured to said support means.

10. A fender structure for tandem vehicle wheels as defined in claim 3 in which said front and rear sections are constructed of fiberglass material.

11. A fender structure for tandem vehicle wheels as defined in claim 3 in which said front and rear sections are constructed of sheet metal material.